US012084632B2

(12) United States Patent
Jordan

(10) Patent No.: US 12,084,632 B2
(45) Date of Patent: Sep. 10, 2024

(54) DRAIN TREATMENT

(71) Applicant: Daniel Jordan, Trophy Club, TX (US)

(72) Inventor: Daniel Jordan, Trophy Club, TX (US)

( * ) Notice: Subject to any disclaimer, the term of this patent is extended or adjusted under 35 U.S.C. 154(b) by 61 days.

(21) Appl. No.: 17/578,814

(22) Filed: Jan. 19, 2022

(65) Prior Publication Data

US 2022/0134391 A1 May 5, 2022

Related U.S. Application Data

(62) Division of application No. 16/511,301, filed on Jul. 15, 2019, now Pat. No. 11,260,434.

(60) Provisional application No. 62/697,837, filed on Jul. 13, 2018.

(51) Int. Cl.

| | |
|---|---|
| ***C11D 3/04*** | (2006.01) |
| ***B08B 3/08*** | (2006.01) |
| ***B08B 9/032*** | (2006.01) |
| ***C11D 3/386*** | (2006.01) |
| ***C11D 3/395*** | (2006.01) |
| ***C11D 17/04*** | (2006.01) |
| ***E03C 1/30*** | (2006.01) |
| ***E03F 9/00*** | (2006.01) |

(52) U.S. Cl.

CPC .............. *C11D 3/044* (2013.01); *B08B 9/032* (2013.01); *C11D 3/386* (2013.01); *C11D 3/3953* (2013.01); *C11D 17/041* (2013.01); *E03C 1/30* (2013.01); *E03F 9/00* (2013.01); *B08B 3/08* (2013.01); *B08B 2209/032* (2013.01)

(58) Field of Classification Search

None

See application file for complete search history.

(56) References Cited

U.S. PATENT DOCUMENTS

2003/0190257 A1* 10/2003 Halstead ................ A61B 1/123 422/301
2012/0138092 A1* 6/2012 Ashrafzadeh ....... A47L 15/4295 134/57 D
2018/0281024 A1* 10/2018 Dobbyn .................... B08B 3/04

FOREIGN PATENT DOCUMENTS

CN 106824866 * 6/2017 ............... B08B 3/02
DE 1020130025776 * 10/2011 ......... A47L 15/4445
JP 2004159942 * 6/2004 ............. A61C 17/00

OTHER PUBLICATIONS

CN106824866 English translation, accessed on Oct. 2023. (Year: 2017).*
DE1020130025776 English translation, accessed on Oct. 2023. (Year: 2011).*
JP2004159942 English translation, accessed on Oct. 2023. (Year: 2004).*

* cited by examiner

*Primary Examiner* — Eric W Golightly
*Assistant Examiner* — Arlyn I Rivera-Cordero
(74) *Attorney, Agent, or Firm* — Snell & Wilmer LLP

(57) ABSTRACT

A method of treating a drainage system includes puncturing, by a controller, a pod retained by a pod housing, wherein the pod contains a drain treatment compound, and introducing, by the controller, water from a water supply to the pod retained by the pod housing to deliver the drain treatment compound dispersed in the water to a drain.

12 Claims, 4 Drawing Sheets

DRAIN TREATMENT

CROSS-REFERENCE TO RELATED APPLICATIONS

This application is a divisional of U.S. patent application Ser. No. 16/511,301, filed on Jul. 15, 2019, now U.S. Pat. No. 11,260,434, issued on Mar. 1, 2022, entitled "DRAIN TREATMENT.

FIELD

This disclosure relates to drainage systems, and more particularly to drain treatment devices, systems, and methods.

BACKGROUND

Grease, sludge, debris, and other contaminants often build up in drainage systems, which may cause a decrease in drainage flow and/or may cause damage to drain pipes and related components. While various treatment compounds may be useful for cleaning drainage systems to reduce the build-up of such contaminants, such treatment compounds are often required to be administered repeatedly over time in order to effectively and efficiently treat a drainage system, and most users either forget or simply don't take the time to manually perform drainage system treatments, thereby causing accumulation of grease, sludge, debris, and other contaminants. Further, even when users do remember to perform a drainage system treatment, the administration of the treatment may be susceptible to human error (e.g., the dosage of treatment compound may be inaccurate).

SUMMARY

Disclosed herein, according to various embodiments, is a drain treatment system that includes a supply interface, a drainage interface, a water distribution assembly, a pod housing, and a controller. The supply interface is configured to connect to a water supply, the drainage interface is configured to connect to a drain, and the distribution assembly is configured to receive water from the water supply via the supply interface. The pod housing is configured to retain at least one pod containing a drain treatment compound, and the controller is configured to control a transfer of the water from the water distribution assembly to the pod housing, wherein the water is configured to carry the drain treatment compound from the at least one pod to the drainage interface for delivery to the drain.

In various embodiments, the water distribution assembly comprises one or more controllable valves, wherein the controller is in electronic communication with the one or more controllable valves. In various embodiments, the water distribution assembly comprises a manifold. The drain treatment system may include one or more controllable valves connected between the manifold and the pod housing, wherein the controller is in electronic communication with the one or more controllable valves. The draining interface may include a dual backflow preventer, wherein the dual backflow preventer is configured to deliver the drain treatment compound dispersed in the water to the drain while preventing the drain treatment compound from flowing upstream from the drainage interface and also while preventing drainage flow from entering the drain treatment system.

In various embodiments, the controller is in electronic communication with the pod housing and is configured to control a pod puncture tool. In various embodiments, the drain treatment system further includes a water pressure sensor in electronic communication with the controller. The system may further include a water quality sensor in electronic communication with the controller.

Also disclosed herein, according to various embodiments, is a drain treatment device. The drain treatment device may include a pod housing configured to retain at least one pod containing a drain treatment compound and a controller configured to control a transfer of water from a water supply to the pod housing, wherein the water is configured to carry the drain treatment compound from the at least one pod to a drain. The pod housing may be configured to retain a plurality of pods. The drain treatment compound may be a first drain treatment compound contained within a first pod of the plurality of pods, wherein each other pod of the plurality of pods contains a respective drain treatment compound. The first drain treatment compound may be different than the respective drain treatment compound(s).

In various embodiments, the first drain treatment compound comprises at least one of bio-enzymes and acids. In various embodiments, the first drain treatment compound comprises a combination of lye and sodium hypochlorite. In various embodiments, the pod housing comprises a pod puncture tool and the controller is configured to control the pod puncture tool.

Also disclosed herein, according to various embodiments, is a method of treating a drainage system. The method may include puncturing, by a controller, a pod retained by a pod housing, wherein the pod contains a drain treatment compound. The method may also include introducing, by the controller, water from a water supply to the pod retained by the pod housing to deliver the drain treatment compound dispersed in the water to a drain.

In various embodiments, introducing, by the controller, the water to the pod is based on passage of a predetermined time. In various embodiments, introducing, by the controller, the water to the pod is based on feedback from one or more sensors. In various embodiments, introducing, by the controller, the water to the pod is based on user input via an application that is in wireless electronic communication with the controller.

The forgoing features and elements may be combined in various combinations without exclusivity, unless expressly indicated herein otherwise. These features and elements as well as the operation of the disclosed embodiments will become more apparent in light of the following description and accompanying drawings.

Figure 1:
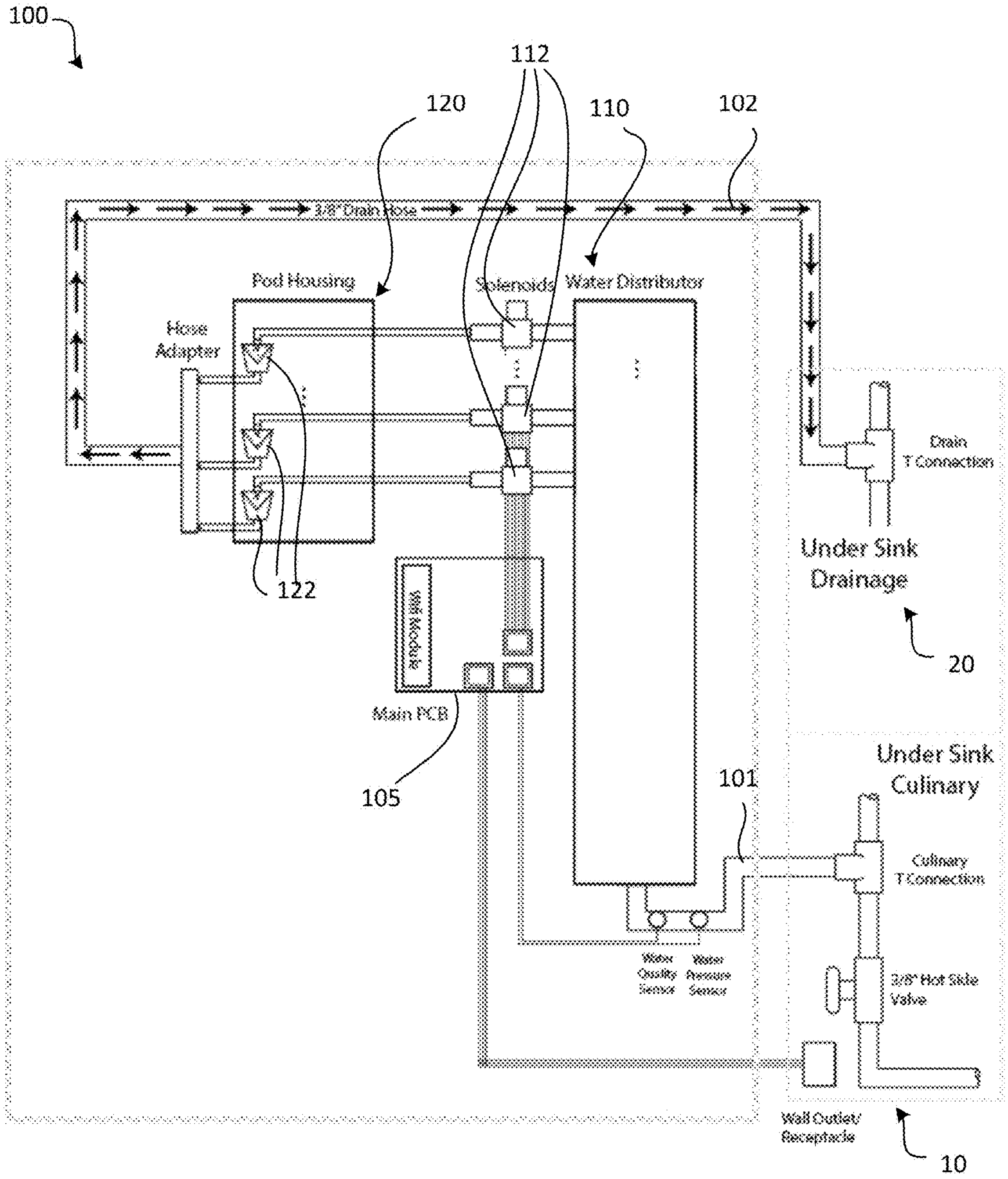
FIG. 1 is a schematic diagram of a drain treatment system, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, is a system, device, and method for treating a drainage system. More specifically, the system, device, and method disclosed herein pertain to automating a periodic/repeated delivery of drain treatment compounds, such as bio-enzymes, acids, etc., to drainage systems in order to remove and/or prevent the build-up of grease, sludge, debris, and other contaminants in drainage systems. For example, FIG. 1 shows a drain treatment system 100, in accordance with various embodiments, that includes a supply interface 101, a drainage interface 102, a water distribution assembly 110, a pod housing 120, and a controller 105. Generally, the supply interface 101 is configured to connect the drain treatment system 100 to a water supply 10, such as a residential hot water supply line, and the drainage interface is configured to connect the drain treatment system 100 to a drain 20, such as a residential sink drain. While numerous details, embodiments, and examples included herein pertain to residential sink drains and other residential drainage implementations, the scope of the present disclosure is not limited to residential drainage, and thus the drain treatment system 100 may be implemented in commercial, industrial, or other types of drainage systems. Further, the sizes of the houses, tubes, and other components shown in the figures are merely illustrative and thus the scope of the disclosure is not limited to such values.

In various embodiments, and with continued reference to the drain treatment system 100 of FIG. 1, the water distribution assembly 110 is configured to receive water from the water supply 10 via the supply interface 101. The pod housing 120 is operably disposed downstream from the water distribution assembly 110 and is configured to retain at least one pod 122 containing a drain treatment compound. In response to water from the water distribution assembly 110 flowing to the pod housing 120 and in response to puncturing (e.g., opening) the at least one pod 122, the contained drain treatment compound is dispersed with the water and is delivered to the drain 20 via the drainage interface 102, according to various embodiments. The controller 105 is configured to control the transfer of the water from the water distribution assembly 110 to the pod housing 120 and/or to control the puncturing (e.g., opening) of the at least one pod 122 via actuatable (e.g., controllable) mechanisms, according to various embodiments.

In various embodiments, the controller 105 includes one or more processors and one or more tangible, non-transitory memories configured to implement digital or programmatic logic. For example, the controller 105 may comprise computer-based system program instructions and/or processor instructions, which may be loaded onto a tangible, non-transitory computer readable medium having instructions stored thereon that, in response to execution by a processor, cause the processor to perform various operations, as described below with reference to FIG. 4. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In re Nuijten to fall outside the scope of patentable subject matter under 35 U.S.C. § 101.

In various embodiments, for example, the one or more processors of the controller 105 may comprise one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof and/or the like, and the one or more tangible, non-transitory memories store instructions that are implemented by the one or more processors for performing various functions, such as the systems and methods of the inventive arrangements described herein.

In various embodiments, and with continued reference to FIG. 1, the drain treatment system 100 may include one or more controllable valves 112 in electronic communication with the controller 105. The one or more controllable valves 112 may be components of the water distribution assembly 110, or the one or more controllable valves 112 may be separate from the water distribution assembly 110 and may be disposed between the water distribution assembly 110 and the pod housing 120. In various embodiments, the water distribution assembly 110 is one or more water lines from the supply interface 101 that are routed to the pod housing 120. For example, the water distribution assembly 110 may be a manifold or other such series of tubes, pipes, hoses, etc.

In various embodiments, the pod housing 120 is configured to retain at least one pod 122. In various embodiments, the pod housing 120 is configured to retain a plurality of pods 122, such as two, four, six, or eight pods, or more. The pod housing 120 may include a hinged lid that opens to allow the user to remove and replace spent pods. The pods may be individually replaced, or the pods may come in a package of multipole pods that are replaced at the same time. The pods 122 each contain a drain treatment compound. Each pod 122 may contain the same drain treatment compound or the plurality of pods 122 may contain different drain treatment compounds (e.g., different in terms of composition, concentration, etc.). In various embodiments, the drain treatment compound includes a bio-enzyme and/or an acid. For example, the drain treatment compound may include lye and sodium hypochlorite.

In various embodiments, the pod housing 120 includes a pod puncture tool. The pod puncture tool may also be in electronic communication with the controller 105, and the controller 105 may be configured to selectively puncture (e.g., open) the pods 122 to allow the water from the controllable valves 112 (e.g., solenoids) to carry the drain treatment compound from the punctured/opened pods to the drain 20 via the drainage interface 102. In various embodiments, the system 100 may be configured so that each pod is substantially emptied during a treatment operation, or each pod may only be partially emptied during a treatment operation, thus allowing the pod to be used again for subsequent treatment operations. In various embodiments, the pod puncture tool may include an upper pod puncture element and a lower pod puncture element that collectively puncture the pod(s) and create a route for water to flow through the pod(s).

In various embodiments, the controller 105 may be configured to periodically perform a treatment operation by puncturing one or more pods 122 and introducing water to the pods 122. For example, the controller 105 may be configured to perform a treatment operation weekly. In various embodiments, the drain treatment system 100 may further include one or more sensors, such as a water pressure sensor and/or a water quality sensor. These sensors may be in electronic communication with the controller 105 and may provide feedback to the controller 105 that affects the frequency of the treatment operations. For example, based on the detected water pressure of the water from the water supply, the controller 105 may adjust the treatment operation. Similarly, the detected hardness and/or pH of the water from the water supply may be used to adjust the treatment operation performed by the controller 105.

In various embodiments, the controller 105 may have a wireless module that enables the controller 105 to interface with remote applications, such as websites and/or applications on a user's computer or mobile device. Via the remote applications, the user and/or technician may change and/or customize operation of system 100. For example, a user may initiate an extra treatment operation after excessive use of a drain, such as after a large meal with extra drainage due to excessive dish washing, etc. Further, a technician (e.g., a back-end service provider) may have access to the system 100 via the wireless module of the controller 105, and may thus not only have access to the treatment operations, but may also receive the detected parameters of the one or more sensors pertaining to the water quality, thus providing for valuable data collection and monitoring of water pressure/quality. The controller 105 may also push notifications to the user via the remote applications, reminding the user to replace the one or more pods retained within the pod housing 120, etc. (e.g., may provide a link to purchase/order more pods). Similarly, the controller 105 may be configured to send notifications to service technicians to indicate that a repair or other such procedure may be warranted. Thus, the controller 105 may serve as a diagnostic, monitoring, and maintenance tool for users, technicians, etc., and may help coordinate effective drain treatment.

Figure 2:
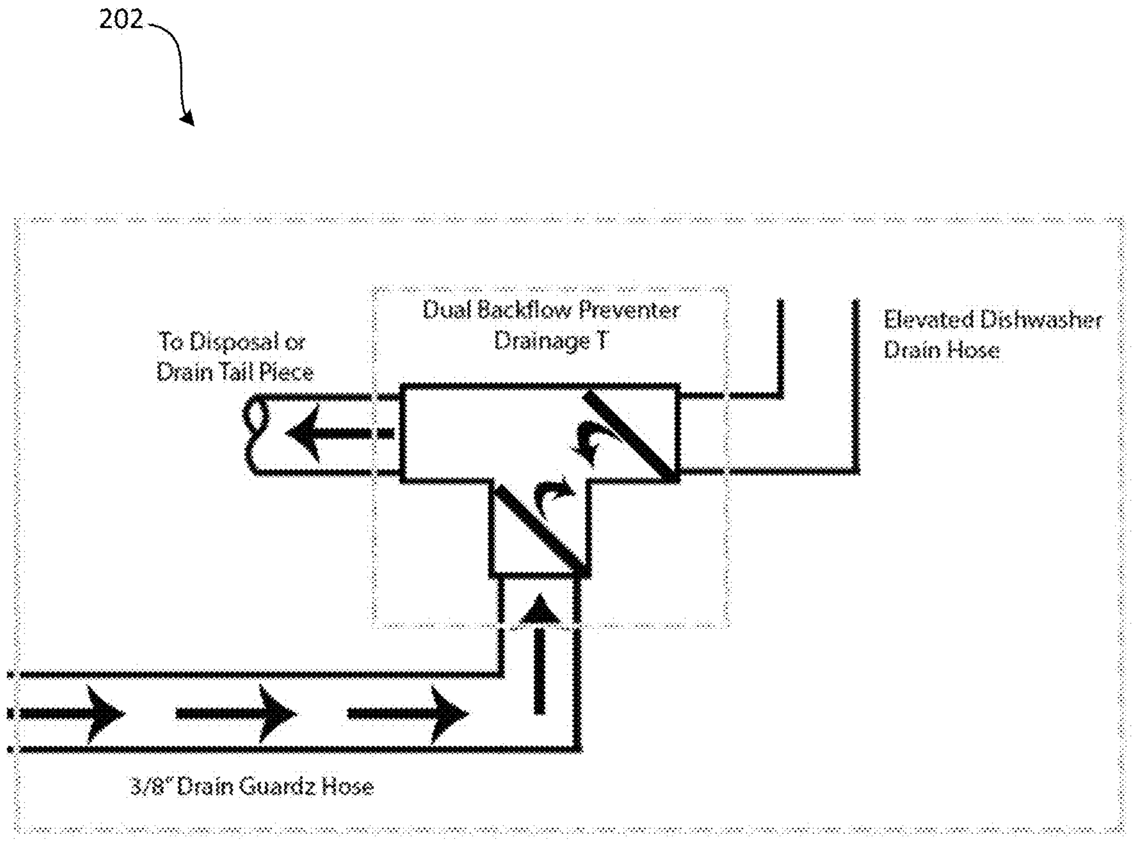
FIG. 2 is a schematic diagram of a dual backflow preventer of a drain treatment system, in accordance with various embodiments.
Figure 3:
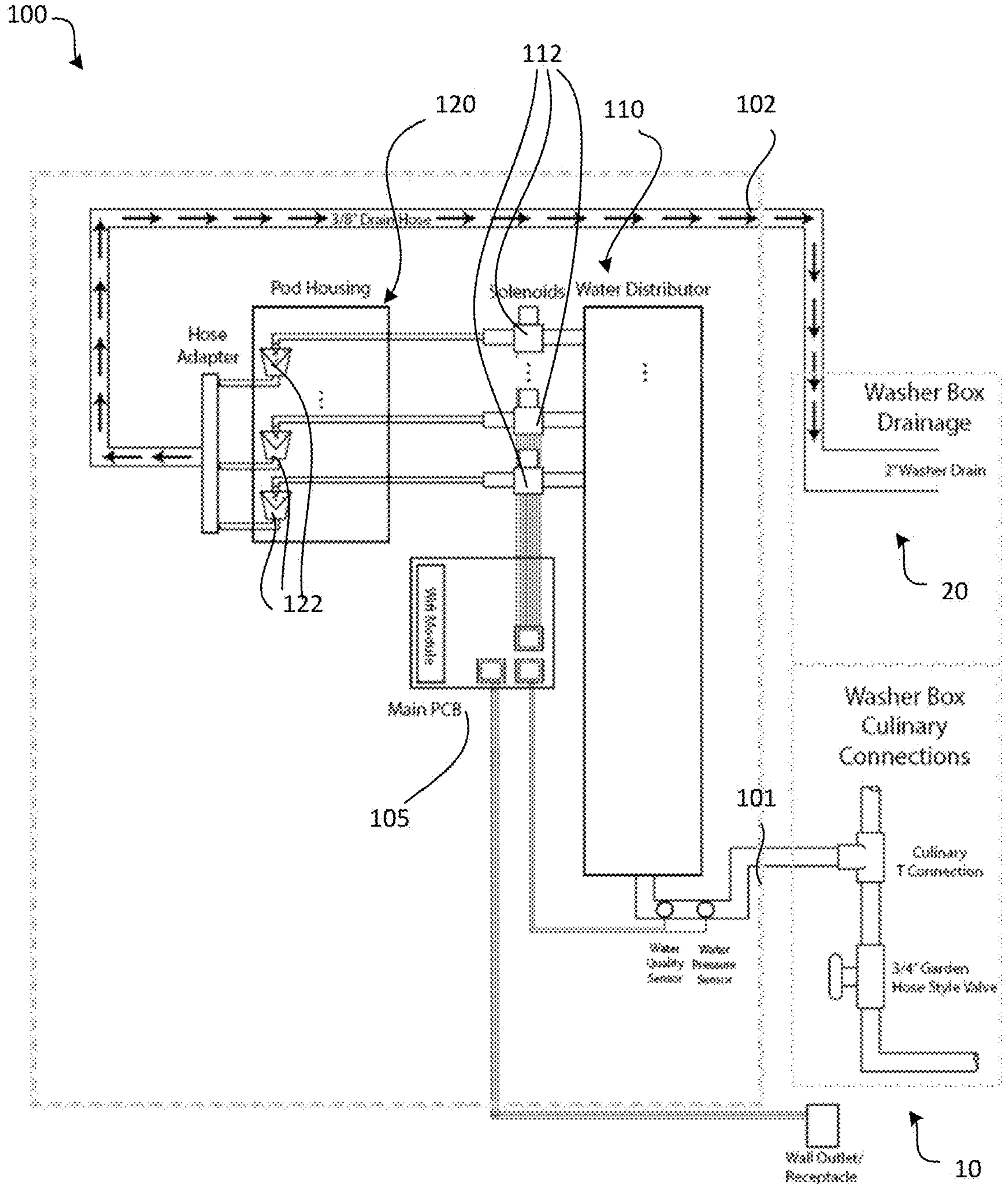
FIG. 3 is another schematic diagram of a drain treatment system, in accordance with various embodiments.

In various embodiments, and with reference to FIG. 2, the drainage interface 202 may include (or may be connected to) a dual backflow preventer. The dual backflow preventer may be configured to deliver the drain treatment compound dispersed in the water to the drain while preventing the drain treatment compound from flowing upstream from the drainage interface and also while preventing drainage flow from entering the drain treatment system. That is, the dual back flow preventer allows the drain treatment compound to be delivered to the drain, but prevents the drain treatment compound from flowing backwards through a drain system (e.g., back into a dishwasher, disposal, sink, etc.). The dual backflow preventer also prevents drainage from entering the drain treatment system 100. In various embodiments, and with reference to FIG. 3, the drain treatment system 100 may be implemented with a clothes washer. As stated above, the present disclosure is not limited to residential sink drains, but may be utilized in other residential assemblies and in commercial/industrial applications.

In various embodiments, a drain treatment device may include a pod housing and a controller. That is, the water distribution assembly and the corresponding interconnecting tubes/houses may be existing components of a drain, and thus the pod housing and the controller may be installed using existing pipes, valves, tubes, hoses, etc.

Figure 4:
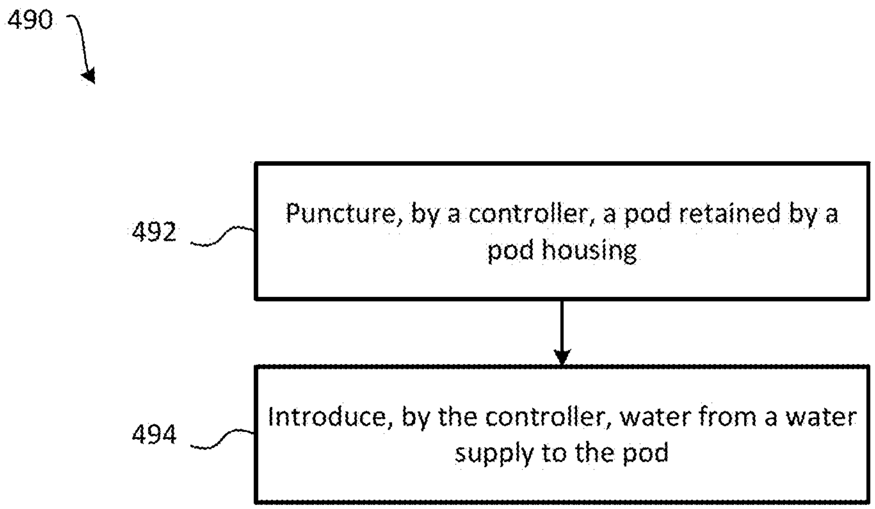
FIG. 4 is a schematic flow chart diagram of a method of treating a drainage system, in accordance with various embodiments.

In various embodiments, and with reference to FIG. 4, a method 490 of treating a drainage system is provided. The method 490 may include puncturing, by a controller, a pod retained by a pod housing, wherein the pod contains a drain treatment compound at step 492. The method 490 may further include introducing, by the controller, water from a water supply to the pod retained by the pod housing to deliver the drain treatment compound dispersed in the water to a drain. As mentioned above, step 492 and/or step 494 may be performed based on the passage of a predetermined time (e.g., a week, 10 days, a month, etc.). In various embodiments, step 492 and/or step 494 may be based on feedback from one or more sensors. In various embodiments, step 492 and/or step 494 may be based on user input via an application that is in wireless electronic communication with the controller.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of treating a drainage system, the method comprising:

puncturing, by a controller, a pod retained by a pod housing, wherein the pod contains a drain treatment compound; and introducing, by the controller, water from a water supply to the pod retained by the pod housing to deliver the drain treatment compound dispersed in the water to a drain;

wherein the introducing, by the controller, the water to the pod is based on feedback from one or more sensors configured to detect a parameter of the water in the water supply.

2. The method of claim 1, wherein the controller punctures the pod with a pod puncture tool, and the controller is in electronic communication with the pod puncture tool.

3. The method of claim 1, wherein the controller is in electronic communication with a controllable valve whereby the water is introduced from the water supply to the pod.

4. The method of claim 1, wherein the pod housing comprises a lid so as to provide access to replace the pod.

5. The method of claim 1, further comprising receiving, by the controller, a feedback signal from a water pressure sensor configured to detect a pressure of the water supplied to the water supply, wherein the water is introduced by the controller to the pod based upon the feedback signal from the water pressure sensor.

6. The method of claim 1, further comprising receiving, by the controller, a feedback signal from a water quality sensor configured to detect a parameter of the water supplied to the water supply, wherein the water is introduced by the controller to the pod based upon the feedback signal from the water quality sensor.

7. The method of claim 1, wherein the water is introduced by the controller from the water supply to the pod via a water distribution assembly comprising at least one controllable valve, wherein the controller is in electronic communication with the at least one controllable valve.

8. The method of claim 1, wherein the pod housing is configured to retain a plurality of pods, the plurality of pods comprising the pod.

9. The method of claim 1, wherein the pod is a first pod and the drain treatment compound is a first drain treatment compound, and the method further comprises:

puncturing, by the controller, a second pod retained by the pod housing, wherein the second pod contains a second drain treatment compound; and introducing, by the controller, water from the water supply to the second pod retained by the pod housing to deliver the second drain treatment compound dispersed in the water to the drain.

10. The method of claim 9, further comprising:

dividing, by the controller, the water into a first flow of water through a first controllable valve and a second flow of water through a second controllable valve;

introducing, by the controller, the first flow of water to the first pod to deliver the first drain treatment compound dispersed in the first flow of water to the drain; and introducing, by the controller, the second flow of water to the second pod to deliver the second drain treatment compound dispersed in the second flow of water to the drain.

11. The method of claim 1, wherein the drain treatment compound comprises at least one of bio-enzymes and acids.

12. The method of claim 11, wherein the drain treatment compound comprises a combination of lye and sodium hypochlorite.

* * * * *